United States Patent
Schweizer

(10) Patent No.: US 9,097,160 B2
(45) Date of Patent: Aug. 4, 2015

(54) METHOD FOR OPERATING AN SCR CATALYIC CONVERTER PROVIDED FOR THE AFTERTREATMENT OF EXHAUST GASES OF AN INTERNAL COMBUSTION ENGINE

(71) Applicant: Robert Bosch GmbH, Stuttgart (DE)

(72) Inventor: Frank Schweizer, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 13/954,159

(22) Filed: Jul. 30, 2013

(65) Prior Publication Data

US 2014/0033682 A1 Feb. 6, 2014

(30) Foreign Application Priority Data

Jul. 31, 2012 (DE) .......................... 10 2012 213 413
Nov. 26, 2012 (DE) .......................... 10 2012 221 574

(51) Int. Cl.
  *F01N 3/00* (2006.01)
  *F01N 3/10* (2006.01)
  *F01N 3/20* (2006.01)

(52) U.S. Cl.
  CPC *F01N 3/10* (2013.01); *F01N 3/208* (2013.01); *F01N 2560/026* (2013.01); *F01N 2610/02* (2013.01); *F01N 2900/0418* (2013.01); *F01N 2900/1402* (2013.01); *F01N 2900/1616* (2013.01); *F01N 2900/1622* (2013.01); *Y02T 10/24* (2013.01)

(58) Field of Classification Search
  None
  See application file for complete search history.

(56) References Cited

U.S. PATENT DOCUMENTS

| | | | | |
|---|---|---|---|---|
| 8,161,730 B2* | 4/2012 | Chi et al. | .......................... | 60/286 |
| 8,745,973 B2* | 6/2014 | Mullins et al. | .................. | 60/301 |
| 8,826,644 B2* | 9/2014 | Ponnathpur | ..................... | 60/285 |
| 2002/0148220 A1* | 10/2002 | Patchett et al. | ................. | 60/286 |
| 2006/0000202 A1 | 1/2006 | Ripper et al. | | |
| 2007/0056267 A1* | 3/2007 | Handler et al. | ................. | 60/286 |
| 2008/0264036 A1* | 10/2008 | Bellovary | ........................ | 60/274 |
| 2010/0005781 A1* | 1/2010 | Schweizer | ....................... | 60/276 |
| 2010/0050611 A1* | 3/2010 | Walz et al. | ....................... | 60/286 |
| 2012/0060469 A1 | 3/2012 | Gady et al. | | |

FOREIGN PATENT DOCUMENTS

DE 102010002620 9/2011

* cited by examiner

*Primary Examiner* — Jesse Bogue
(74) *Attorney, Agent, or Firm* — Michael Best & Friedrich LLP

(57) ABSTRACT

In a method for operating an SCR catalytic converter provided for the reduction of NOx in exhaust gases of an internal combustion engine, which SCR catalytic converter is operated with a reagent which can be stored in the SCR catalytic converter such that there is a certain reagent fill level in the SCR catalytic converter, wherein the actual NOx concentration downstream of the SCR catalytic converter is monitored on the basis of the signal of a sensor, which is arranged downstream of the SCR catalytic converter and which is sensitive at least with respect to NOx, in comparison with a calculated NOx concentration downstream of the SCR catalytic converter, it is provided according to the invention that, in the case of a comparison result which represents a conversion deficit as a difference between the measured actual NOx concentration and the previous calculated reagent fill level in the SCR catalytic converter is corrected to a new calculated reagent fill level, whereby an immediate dosing of reagent takes place.

16 Claims, 7 Drawing Sheets

METHOD FOR OPERATING AN SCR CATALYIC CONVERTER PROVIDED FOR THE AFTERTREATMENT OF EXHAUST GASES OF AN INTERNAL COMBUSTION ENGINE

BACKGROUND OF THE INVENTION

The present invention relates to a method for operating an SCR catalytic converter provided for the after treatment of exhaust gases of an internal combustion engine. The SCR catalytic converter is operated with a reagent which is introduced upstream of the SCR catalytic converter or a precursor of the reagent, wherein the actual NOx concentration downstream of the SCR catalytic converter is monitored on the basis of the signal of a sensor, which is arranged downstream of the SCR catalytic converter and which is sensitive at least with respect to NOx, in comparison with a calculated NOx concentration on the basis of modeled values.

The invention also relates to a computer program and a computer program product which are provided for carrying out the method.

Methods and devices are known for operating an internal combustion engine in particular in motor vehicles, in the exhaust-gas region of which there is arranged an SCR (selective catalytic reduction) catalytic converter by means of which the nitrogen oxides (NOx) contained in the exhaust gas of the internal combustion engine are reduced in the presence of a reagent to form nitrogen. The content of nitrogen oxides in the exhaust gas can be considerably reduced in this way. It is possible for ammonia ($NH_3$) or formic acid, for example, to be provided as reagent for the reaction process. The reagent or a precursor is admixed to the exhaust gas upstream of the catalytic converter, by virtue of for example $NH_3$, either $NH_3$ directly or reagents which split to form $NH_3$, preferably a urea-water solution, being used as reagent. The urea-water solution is injected into the exhaust tract upstream of the SCR catalytic converter by means of a dosing device. From said solution there is formed $NH_3$ which acts as a reagent or as a NOx reducing agent. The demand for reagent is dependent on the untreated NOx emissions % NOx–Roh of the engine and thus in particular on the present rotational speed and the torque of the internal combustion engine. The dosing is therefore carried out preferably as a function of characteristic operating variables of the internal combustion engine and as a function of characteristic exhaust-gas variables.

The dosing of the reagent must be carefully defined. In the case of excessively low dosing, the nitrogen oxides can no longer be completely reduced in the SCR catalytic converter and are released as emissions. In the case of excessively high dosing, so-called reagent slippage ($NH_3$ slippage) may occur, which firstly leads to an unpleasant smell as a result of the $NH_3$ that is released, and secondly results in an unnecessarily high consumption of reagent.

An SCR catalytic converter has storage characteristics for the reagent. The stored $NH_3$ amount is also referred to as the reagent fill level of the SCR catalytic converter. Here, the reagent fill level denotes the degree of loading of the SCR catalytic converter with stored reagent. The reagent storage behavior is dependent on the respective operating temperature of the SCR catalytic converter. The lower the temperature, the greater the storage capability.

The efficiency of an SCR catalytic converter is dependent both on the temperature and also on the reagent fill level. With an increasing reagent fill level, the efficiency increases.

If it is sought to attain the highest possible NOx conversion rates, it is necessary to operate the SCR catalytic converter with a high reagent fill level. If the maximum reagent fill level is reached, reagent slippage may briefly occur in the event of load steps or under transient conditions of the internal combustion engine, even in the case of a very precisely configured dose amount. This may be the case even when reagent is no longer being dosed. In general, this is tolerable in order to achieve a high NOx conversion target.

The calculation of the required amount of reagent is subject to a multiplicity of errors and deviations. For example, the calculation of the dose amount is influenced by the untreated NOx emissions % NOx–Roh, the efficiency of the SCR catalytic converter and inaccuracies of the dosing system itself. An incorrectly calculated reagent fill level in the SCR catalytic converter may therefore arise even in the case of a new, carefully applied system. In general, an adaptation of the reagent fill level is necessary. For this purpose, use is normally made of a NOx sensor which is arranged downstream of the SCR catalytic converter and which detects the amount of nitrogen oxide downstream of the SCR catalytic converter. Owing to the measurement principle in the case of conventional NOx sensors, said sensors generally exhibit cross-sensitivity with respect to the reagent $NH_3$. This is referred to as a reagent cross-sensitive, for example an $NH_3$ cross-sensitive, NOx sensor. A conventionally used NOx sensor thus measures a summed signal of NOx and $NH_3$.

The SCR catalytic converter model used for an adaptation dynamically calculates the NOx emissions downstream of the SCR catalytic converter. Deviations from the measured NOx sensor values may have various causes: aside from the model inaccuracy (up to ±50 ppm) as a first cause, the causes of the deviation may be an underestimation of the reagent fill level in the SCR catalytic converter and thus a release of $NH_3$ (reagent slippage), or an overestimation of the reagent fill level and thus a conversion deficit and a release of NOx (NOx slippage).

To optimize the dosing of the reagent, the laid-open specification DE 10 2004 031 624 A1 proposes a method for operating an SCR catalytic converter used for the purification of the exhaust gas of an internal combustion engine control or regulation of the reagent fill level in the SCR catalytic converter to a predefined setpoint value. The theoretical reagent fill level in the SCR catalytic converter is determined on the basis of a catalytic converter model (SCR model). By means of the targeted specification of the setpoint value, it is intended to ensure that, in particular in transient states of the internal combustion engine, firstly there is an adequate amount of reagent available for the catalytic reduction of nitrogen oxides, and secondly reagent slippage is avoided. Said method is suitable for compensating drifts or slow changes in the behavior of the SCR catalytic converter. For a compensation of very large and spontaneous changes, for example in the event of tank replenishment with an incorrect reagent (for example water), such methods lead to only unsatisfactory results, because the regulation times are very long and last for several hours, for example.

The laid-open specification DE 10 2010 002 620 A1 describes the setting of a long-term adaptation factor. The long-term adaptation factor has a direct influence on the pilot-control amount of the reagent. The dosing strategy thus adapts to the respective system and to longer-term environmental influences and can thus reduce the number of adaptation interventions necessary in the case of systematic errors. The above-mentioned problem cannot be solved through the use of long-term adaptation factors either, because here, too, the adaptation to large and spontaneous changes is very inert.

It is, by contrast, the object of the invention to be able to react very quickly to dose amount deviations which lead to inadequate exhaust-gas after treatment. Here, it is sought in particular to provide an immediate measure for being able to optimally operate the exhaust-gas after treatment system.

SUMMARY OF THE INVENTION

The method according to the invention is provided for the operation of an SCR catalytic converter provided for the after treatment of exhaust gases of an internal combustion engine, wherein the SCR catalytic converter is operated with a reagent which is introduced into the exhaust tract upstream of the SCR catalytic converter, or a precursor of the reagent. The SCR catalytic converter may for example be impinged on by $NH_3$, or reagents which split to form $NH_3$, as reagent for the reduction of nitrogen oxides. In principle, the method according to the invention is also suitable for the operation of other catalytic converters which are operated with a reagent. During the operation of the SCR catalytic converter, the actual NOx concentration downstream of the SCR catalytic converter is measured on the basis of the signal of a sensor, which is arranged downstream of the SCR catalytic converter and which is sensitive at least with respect to NOx, and compared with the calculated NOx concentration downstream of the SCR catalytic converter.

In the case of an SCR catalytic converter, high reagent fill levels in the SCR catalytic converter are necessary for high NOx conversion rates. Here, the reagent fill level in the SCR catalytic converter is a decisive variable. The system can be monitored constantly by means of the comparison of the calculated NOx concentration downstream of the SCR catalytic converter, which can be calculated on the basis of the amount of reagent supplied and consumed, and the actually present actual NOx concentration downstream of the SCR catalytic converter, which is measured by means of the sensor which is downstream of the catalytic converter and which is sensitive at least with respect to NOx. Most conventional SCR systems already use SCR models in order to perform monitoring on the basis of calculated values.

As an immediate measure for a fill level adaptation, the method according to the invention proposes that, in the event of a conversion deficit as a difference between the actual NOx concentration and the calculated NOx concentration, or in the case of data which represent such a conversion deficit, an immediate dosing of reagent be performed in order thereby to increase the reagent fill level in the SCR catalytic converter. Here, the approach according to the invention assumes that an excessively low reagent fill level in the SCR catalytic converter, or generally underdosing of the reagent, is present if the measured actual NOx concentration lies below the calculated NOx concentration. The reagent fill level in the SCR catalytic converter must thus lie below the reagent setpoint fill level. If the SCR catalytic converter is filled as quickly as possible with said difference, then the reagent fill level and the reagent setpoint fill level correspond again, and the measured actual NOx concentration will rapidly improve again up to the calculated NOx concentration or correspondingly also to the calculated SCR catalytic converter efficiency. It is essential here that the dosing of the reagent takes place immediately, that is to say directly or at least within a relatively short period of time, which lies for example in the range of seconds or a few minutes.

By means of said immediate measure for the reagent fill level adaptation, it is possible according to the invention for the dose amount deviation to be compensated immediately after the detection thereof, and the system attains the required conversion rates again virtually immediately. Here, the method according to the invention uses the reagent fill level in the SCR catalytic converter as a core variable for the NOx conversion in the SCR catalytic converter or for the attainable NOx emissions values downstream of the SCR catalytic converter.

The immediate dosing of reagent is attained by virtue of the previous calculated reagent fill level in the SCR catalytic converter being corrected to a new calculated reagent fill level. Said approach leads to the desired immediate dosing of reagent for the fast restoration of the optimum conversion characteristics of the SCR catalytic converter.

Previously conventional adaptation methods generally require several hours to be able to react to changes by means of a corresponding adjustment of the system. The method according to the invention permits, in the course of the described immediate measure, a correction of the dose amount deviation within a few seconds or, at most, minutes. Here, with the method according to the invention, the excessively low reagent fill level, which is highly probably the cause for the conversion deficit, is corrected immediately and generally completely. Other methods realize an adaptation of the system indirectly via a change in the dose amount factor. Consequently, long time periods are hereby necessary for the correction of the reagent fill level.

By means of the immediate measure according to the invention, it is possible to react very quickly to changing conditions. The required purification of the exhaust gas is ensured without the occurrence of an intolerable release of NOx emissions in particular.

One refinement of the approach according to invention provides that, in order to rectify a longer-term reagent underdosing, an additional dosing factor for a long-term adaptation be calculated and used. In the course of the operation of the SCR catalytic converter with possibly required implementation of the immediate measure (dosing) described above, the dose amount of the dosings $mDos_{Add}$ carried out is integrated to give the summed dose amount of the regular dosings $mDos_{reg}$. From said overall summed dose amount $mDos_{tot}$ in relation to the assumed summed dose amount without dosings having taken place $mDos_{reg}$ ($mDos_{tot}-mDos_{Add}$), an additional dosing factor facDos for the operation of the SCR catalytic converter is determined.

In a particularly preferred embodiment, the summed dose amount of the additional dosings $mDos_{Add}$ is corrected with the additional dosing factor facDos ($mDos_{tot}-mDos_{AddKorr}$). This is possible because, in the case of the underdosing assumed according to the invention, the dose amount for a fill level adaptation is smaller than a nominal fill level adaptation.

The method according to the invention can particularly advantageously be carried out such that the dosings performed in the event of a difference being detected between the measured and calculated NOx concentrations are adjusted. The reagent fill level can thus be corrected continuously, by the additive corrective reagent amount, by means of the fill level regulator on the basis of the detected difference.

A first possibility for immediately increasing the reagent fill level provides the manipulation of an offset of an integrator incorporated in the fill level regulator. Another possibility for at least promptly increasing the reagent fill level provides the influencing of an input variable of the integrator. It is assumed here that the integration time is very short and lies for example in the range of seconds or a few minutes as mentioned above, and is thus considerably shorter than the times for one or more different adaptations.

The regulation in the case of the dosing has the particular advantage that the method can be carried out continuously, whereby the adaptation of the reagent fill level can be further optimized.

In a particularly preferred refinement of the method according to the invention, the immediate dosing according to invention for the adaptation of the reagent fill level in the SCR catalytic converter is further optimized with at least one further adaptation factor. The calculation of the further adaptation factor preferably incorporates values relating to the mass flows of the untreated NOx emissions % NOx–Roh, the calculated NOx emissions downstream of the SCR catalytic converter, and the actual NOx concentrations, measured by the sensor, downstream of the SCR catalytic converter.

Furthermore, a long-term adaptation factor is preferably taken into consideration if such a factor is used during the fill level adaptations. The adaptation of the dosing of reagent by taking into consideration an adaptation factor, that is to say taking into consideration a further dose amount adaptation, may be used both for the dosing using an additional dosing factor facDos and also for the dosing by means of regulation. It is thus possible to carry out a long-term dose amount compensation which also incorporates a possibly already existing continuous dose amount adaptation.

A suitable adaptation factor which can be used according to the invention for the correction of the dosings is described for example in the laid-open specification DE 10 2010 002 620 A1. According to said document, the adaptation factor facQtyalt is determined from the following formula:

$$facQtyAdap = (m\% \text{ NOx-Roh} - m\% \text{ NOx-Mod})/(m\% \text{ NOx-Roh} - m\% \text{ NOx-Mess}) * facQtyalt$$

where:
m % NOx–Roh is the integral of NOx untreated emissions % NOx–Roh
m % Nox–Mod is the integral of calculated NOx emissions % NOx–Mod downstream of the SCR catalytic converter
m % Nox–Mess is the integral of the emissions measured by the sensor, downstream of the SCR catalytic converter
facQtyalt is a long-term adaptation factor during the fill level adaptations The additional dosing factor facDos determined according to the invention may replace or correct a long-term adaptation factor presently used for the operation of the SCR catalytic converter. The present long-term adaptation factor may, for example, depending on the application, be overwritten or corrected with the calculated additional dosing factor facDos after a certain number of fill level adaptations or at the end of the driving cycle of a motor vehicle equipped with the internal combustion engine or at the start of the next driving cycle. Here, depending on the application, temporary storage of the values in a control unit may take place.

As already mentioned, the method according to the invention for fill level adaptation assumes that, in the case of a conversion deficit being measurable, NOx slippage or reagent underdosing is present. This is admissible and expedient because, in the present legislation, NOx slippage is evaluated as being far more critical than reagent slippage which would occur in the event of overdosing. Assuming the underdosing, the method according to the invention makes possible for a diluted reagent solution, for example a urea-water solution of excessively low concentration, to be detected very quickly and for the associated inadequate exhaust-gas after treatment to be quickly corrected. Here, isolated occurrences of reagent slippage, which is not always avoidable in the use of the method according to the invention, can be tolerated.

In a particularly preferred refinement of the method according to the invention, continuous reagent slippage in relatively large amounts is prevented by adaptation of the method, such that a release of reagent in relatively large amounts can be reliably avoided, in particular with regard to environmental protection and consumption aspects.

According to the invention, in one advantageous refinement, it is therefore checked during the execution of the method whether overdosing of reagent into the SCR catalytic converter occurs. If reagent overdosing is detectable, the execution of the method is adapted. The monitoring of possibly occurring reagent overdosing preferably takes place on the basis of reagent slippage detection. In the case of an SCR catalytic converter, it is thus checked whether reagent emerges from the SCR catalytic converter. This is preferably realized by monitoring the NOx concentrations upstream and downstream of the SCR catalytic converter. If the signal measured by the sensor, which is sensitive at least with respect to NOx, downstream of the SCR catalytic converter is greater than the NOx signal upstream of the SCR catalytic converter, which may be measured or alternatively provided by means of a NOx untreated emissions model, it can be assumed that reagent slippage, that is to say in particular $NH_3$ slippage, is present, because said situation is not physically possible otherwise. Isolated increases in reagent concentration downstream of the SCR catalytic converter, for example up to 150 ppm, may duly arise up to the point of reagent slippage being detected. In relation to the driving cycle as a whole, and the rather low probability of the occurrence of such peaks, this is however non-critical.

The adaptation of the method according to the invention if reagent overdosing is detectable may be realized by various measures. In particular, the dosing may be provisionally shut off and/or the estimated reagent fill level in the SCR catalytic converter may be reinitialized with a maximum physical value taking into consideration the present operating temperature of the SCR catalytic converter. Said measure has the effect that the dosing by the reagent fill level regulator is stopped until the nominal reagent fill level in the SCR catalytic converter is reached again. As a further measure, the presently used long-term adaptation factor may be reduced or decreased. This may be realized for example by means of a further factor or by means of an offset or by means of a combination of both. Said measures may be implemented individually or in combination. Possibly occurring underdosing of the reagent can subsequently, by means of the fill level adaptation according the invention, be immediately adapted again or at least promptly corrected and thus rectified.

The invention also comprises a computer program which performs all of the steps of the described method when executed on a computer or a control unit.

Finally, the invention comprises a computer program product having program code, which is stored on a machine-readable carrier, for carrying out the method according to the invention when the program is executed on a computer or a control unit.

The implementation of the invention as a computer program or as a computer program product has the particular advantage that the advantages of the method according to the invention can be utilized even in existing motor vehicles by virtue of the computer program being stored for example in the control unit of the internal combustion engine or in a special exhaust-gas control unit, without further modifications of the catalytic converter system being necessary.

BRIEF DESCRIPTION OF THE DRAWINGS

Further advantages and features of the invention will emerge from the following description of exemplary embodi- In the figures.

DETAILED DESCRIPTION

Figure 1:
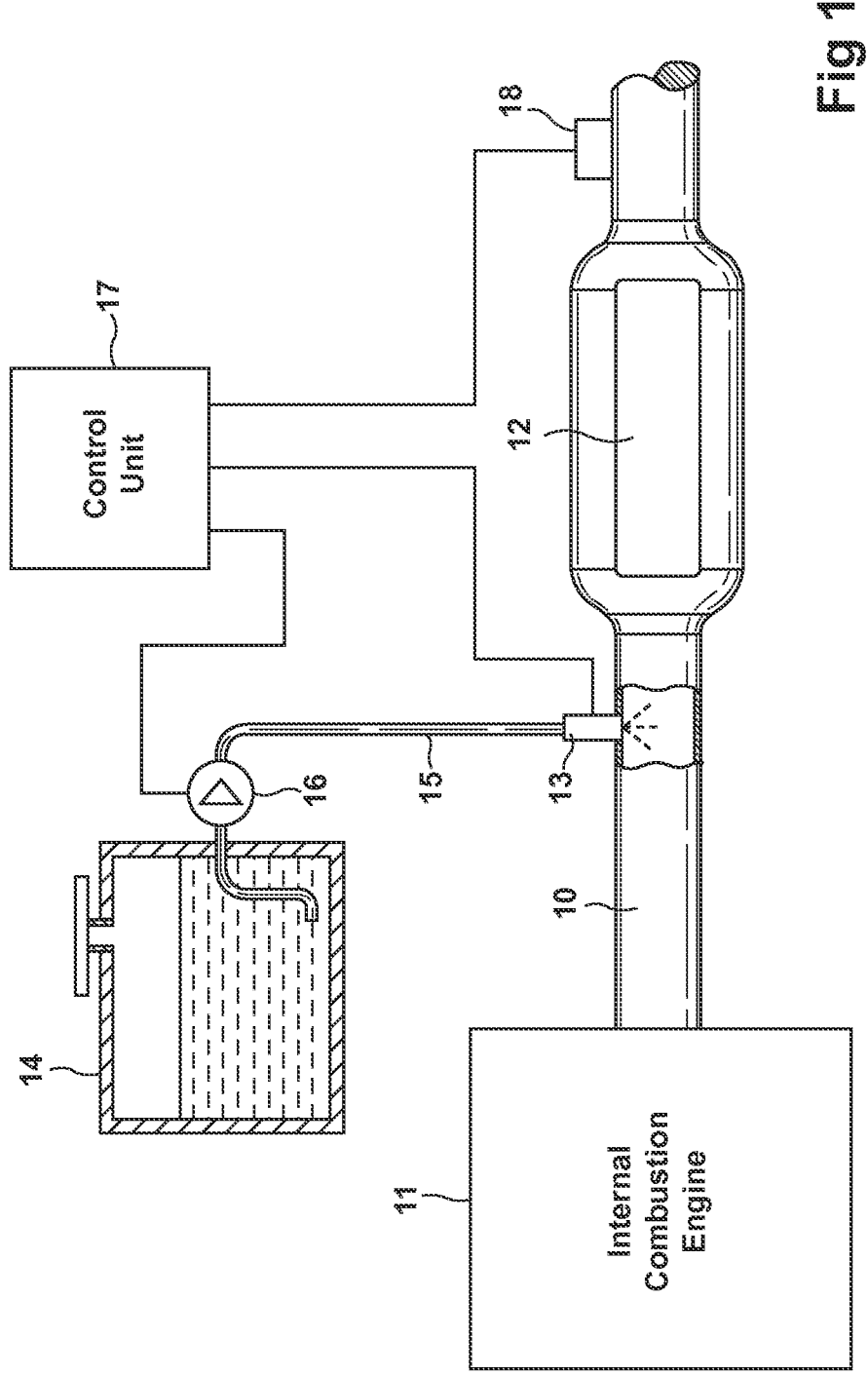
FIG. 1 is a schematic illustration of the components of an SCR catalytic converter system (prior art)

FIG. 1 schematically shows some known components of an SCR catalytic converter system. Arranged in the exhaust tract 10 of an internal combustion engine 11 is an SCR catalytic converter 12 which, by selective catalytic reduction (SCR), selectively reduces nitrogen oxides (NOx) in the exhaust gas. For said reaction, ammonia ($NH_3$), for example, is used as reducing agent. That reagent is in this case a reducing agent. Since $NH_3$ is a toxic substance, said substance is preferably obtained from the non-harmful carrier substance urea. The urea is injected, as a liquid urea-water solution, into the exhaust tract 10 upstream of the SCR catalytic converter 12 by means of the dosing device 13. The aqueous urea solution is stored in a reagent tank 14 and is conducted under pressure to the dosing valve 13 via a line 15 by means of a delivery pump 16. The urea-water solution is injected into the exhaust tract 10 in a precise manner, and according to demand, under the control of the control unit 17.

The nitrogen oxides contained in the exhaust gas of the internal combustion engine 11 are reduced to form nitrogen as a result of the conversion in the SCR catalytic converter 12. The conversion of NOx to $N_2$ can be checked by means of a sensor 18 which is arranged downstream of the SCR catalytic converter 12 and which is sensitive at least with respect to NOx. Use is normally made of a NOx-sensitive sensor 18 which exhibits cross-sensitivity with respect to the reagent $NH_3$. Said sensor thus measures a summed signal of NOx and $NH_3$. An increased signal of the sensor 18 can thus indicate both an increased concentration of NOx and also an increased concentration of $NH_3$. In the first case, the nitrogen oxides from the exhaust gas of the internal combustion engine 11 have not been adequately converted in the SCR catalytic converter 12. It is to be assumed here that excessively low reagent dosing by means of the dosing device 13 took place (underdosing). If, in the other case, in the case of an increased signal of the sensor 18, an increased concentration of $NH_3$ is present, overdosing of the reagent is to be assumed.

The method according to the invention assumes underdosing in the case of a dose amount deviation being detectable. That is to say that, in the case of an increased signal of the sensor 18 which is sensitive with respect to NOx, it is assumed that said signal is based on an increased concentration of NOx, and that the reagent fill level $NH_3$—FS in the SCR catalytic converter 12 is too low. If an increased signal of the sensor 18 which is sensitive at least with respect to NOx indicates a conversion in the SCR catalytic converter 12 which lies above a calculated NOx concentration downstream of the SCR catalytic converter 12, corresponding to an excessively low calculated efficiency eta of the SCR catalytic converter 12, the invention assumes that the actual reagent fill level $NH_3$—FS-Ist lies below the setpoint reagent fill level $NH_3$—FS-Soll in the SCR catalytic converter 12.

According to the invention, the reagent fill level $NH_3$—FS in the SCR catalytic converter 12 is replaced with said difference by means of an immediate dosing of reagent or of a precursor of the reagent by means of the dosing device 13. As a result, the actual reagent fill level $NH_3$—FS-Ist corresponds to the setpoint reagent fill level $NH_3$—FS-Soll again, and the determined conversion level improves up to the calculated conversion level or efficiency eta, such that optimum exhaust gas after treatment is restored.

Here, the invention utilizes the fact that most modern SCR models calculate the present reagent fill level $NH_3$—FS-Ist on the basis of the dose amount supplied and the dose amount consumed. For the present invention, said calculation is reversed, such that the actual reagent fill level $NH_3$—FS-Ist can be calculated from the present conversion level or efficiency eta of the SCR catalytic converter 12.

Figure 2:
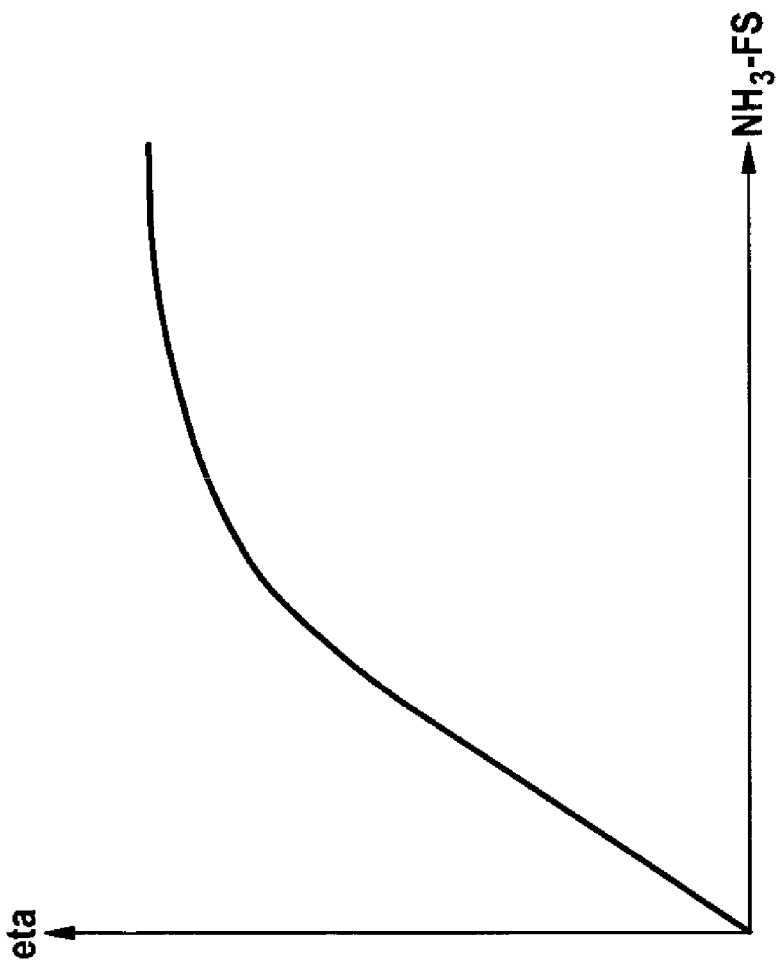
FIG. 2 shows a relationship between a reagent fill level in an SCR catalytic converter and the NOx conversion efficiency thereof.

The general relationship between the reagent fill level $NH_3$—FS in the SCR catalytic converter 12 and the efficiency eta of an SCR catalytic converter 12 is shown in FIG. 2. It can be seen from said figure that the efficiency eta is dependent on the reagent fill level $NH_3$—FS in the SCR catalytic converter 12. It can also be seen that the relationship is unique.

Figure 3:
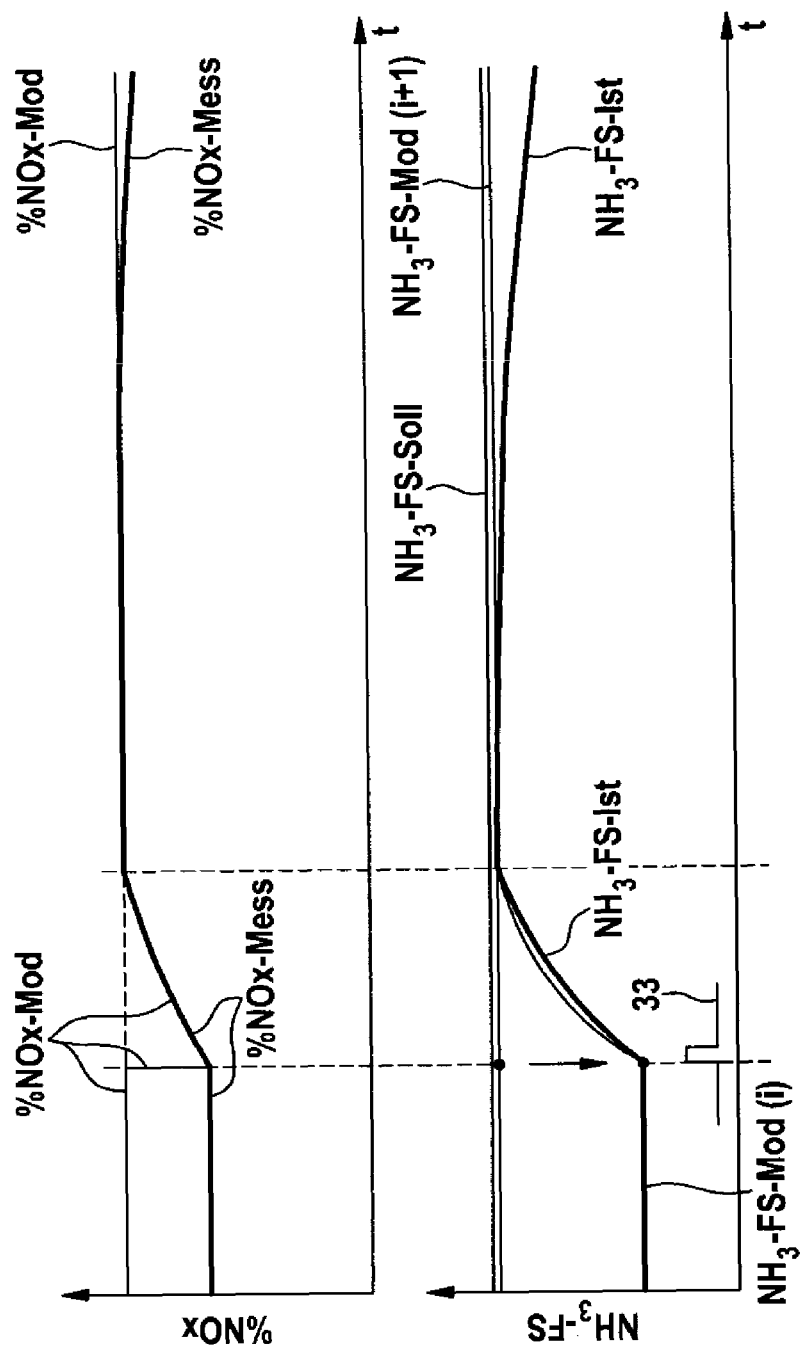
FIG. 3 is a schematic illustration of the profile with respect to time of the NOx concentration downstream of the SCR catalytic converter system (upper part) and of the reagent fill level (lower part) during the implementation of the immediate measure according to the invention in an SCR catalytic converter system.

The profile with respect to time of the immediate measure according to the invention, specifically of the direct dosing of reagent, is illustrated in FIG. 3 on the basis of the profile with respect to time of the NOx concentration % NOx downstream of the SCR catalytic converter 12, or of the efficiency eta of the SCR catalytic converter 12, in the upper part of the figure, and on the basis of the profile with respect to time of the reagent fill level $NH_3$—FS, which can be calculated from the conversion capability, in the lower part of the figure. The value for the actually measured NOx concentration % NOx–Mess, which is based on the signals of the NOx-sensitive sensor 18, initially lies below the calculated NOx concentration % NOx–Mod.

In the control unit 17, the sensor value % NOx–Mess for the NOx concentration % NOx is converted into an actual reagent fill level $NH_3$—FS-Ist. Above a predefined difference between the actual reagent fill level $NH_3$—FS-Ist and the setpoint reagent fill level $NH_3$—FS-Soll, an immediate or at least prompt dosing is triggered (measure 33) which compensates the difference between the actual reagent fill level $NH_3$—FS-Ist and the setpoint reagent fill level $NH_3$—FS-Soll.

Plotted in the lower part of FIG. 3 are the calculated reagent fill level $NH_3$—FS-Mod (i), which is assumed until measure 33, and the calculated reagent fill level $NH_3$—FS-Mod (i+1), which is assumed after the measure 33. At the time of the triggering of measure 33, the immediate or at least prompt dosing of reagent, the calculated value of the reagent fill level $NH_3$—FS is changed in a step-like manner from the preceding value $NH_3$—FS-Mod (i) to the new value $NH_3$—FS-Mod (i+1).

By means of the measure 33, the NOx conversion can be increased again or the measured NOx concentration % NOx–Mess can be decreased owing to the increase of the efficiency eta of the SCR catalytic converter 12, such that optimum exhaust-gas purification in the SCR catalytic converter 12 is attained. Over the course of time, a decrease of the actual reagent fill level $NH_3$—FS-Ist may occur again, such that a further adaptation measure may be necessary.

Additionally, according to the invention, as a long-term measure, an additional dosing factor is determined on the basis of the described fill level adaptations (immediate measure), which additional dosing factor permits a long-term optimization of the dosing strategy and reduces the number of possible required immediate adaptations.

Figure 4:
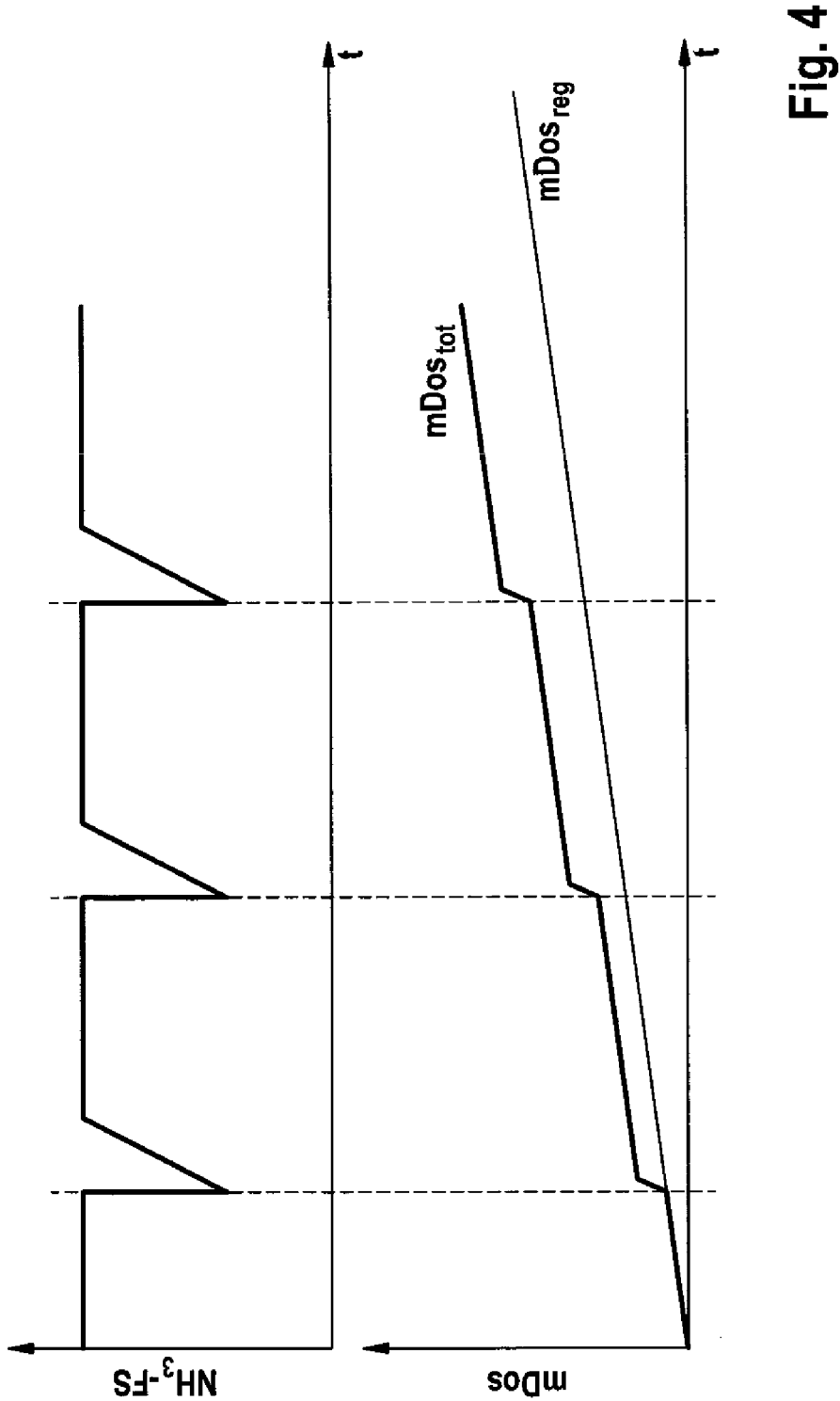
FIG. 4 is a schematic illustration of the profile with respect to time of the reagent fill level (upper part) and of the dose amount (lower part) during the course of the long-term adaptation according to the invention, calculating an additional dosing factor in the case of an SCR catalytic converter system.

Upon the start of the first fill level adaptation, the dose amount flow mDos of the dosings $mDos_{Add}$ are integrated to give the summed dose amount of the regular dosings $mDos_{Reg}$, that is to say the pilot-controlled dose amount, so as to yield the overall dose amount $mDos_{tot}$. The illustration in FIG. 4 schematically illustrates the profile with respect to time of the reagent fill level $NH_3$—FS in the upper part and the profile of the overall dose amount $mDos_{tot}$ and the pilot-controlled dose amount $mDos_{reg}$ during the method according to the invention, in which multiple fill level adaptations are performed in the case of a conversion deficit being measurable. The additional dosing factor facDos can be determined from the ratio of the overall dose amount $mDos_{tot}$ and the pilot-controlled dose amount $mDos_{reg}$. The determination of the additional dosing factor facDos can be described using the following equation:

$$facDos = \frac{mDos_{tot}}{mDos_{tot} - mDos_{Add}}$$

It is particularly preferable for the additional dose amount flow $mDos_{Add}$ to be corrected by means of the fill level adaptations with the additional dosing factor facDos:

$$facDos = \frac{mDos_{tot}}{mDos_{tot} - mDos_{AddKorr}}$$

$$mDos_{AddKorr} = \frac{mDos_{Add}}{facDos}$$

wherein $mDos_{AddKorr}$ describes the sum of the dose amount flow of the fill level adaptations which are corrected with the additional dosing factor. This is particularly advantageously possible because, if underdosing is present, the dose amount of the fill level adaptations $mDos_{Add}$ is lower than the nominal fill level adaptation. Assume that the setpoint reagent fill level $NH_3$—FS-Soll is 1.0 g and the present actual reagent fill level $NH_3$—FS-Ist, determined from the reverse calculation, is 0.5 g. Assume also that the additional dosing factor is 2, that is to say a doubled dose amount is necessary. If the reagent fill level $NH_3$—FS is now replenished, then, without further correction, a difference of 0.5 g reagent (nominal fill level adaptation) would be replenished. Owing to the underdosing, however, only half of the dose amount is dosed, such that the 0.5 g reagent (nominal) actually corresponds to only 0.25 g. Without correction, the result would thus be an overall amount of 0.75 g in the SCR catalytic converter 12. Said overall amount is however ideally 1.0 g. The additional dosing factor may be updated in the software for example every 20 ms and is thus dependent on the preceding value (facDos (i)=f(facDos(i−1)).

In a further particularly preferred refinement of the method according to the invention, the additional dosing factor facDos is additionally corrected or adapted with a presently used adaptation factor. The additional adaptation factor is preferably a factor facQtyAdap which is determined on the basis of calculated and measured NOx emissions values upstream and downstream of the SCR catalytic converter 12. Said adaptation preferably takes place in accordance with the following formulae:

$$mDos_{AddKorr} = \frac{mDos_{Add}}{facDos \times facQtyAdap}$$

$$facQtyAdap = (m\%NOx\text{-Roh} - m\%NOx\text{-Mod}) /$$
$$(m\%NOx\text{-Roh} - m\%NOx\text{-Mess}) \times facQtyalt$$

Here:
m % NOx–Roh is the integral of NOx untreated emissions % NOx–Roh
m % Nox–Mod is the integral of calculated NOx emissions % NOx–Mod downstream of the SCR catalytic converter 12
m % Nox–Mess is the integral of measured NOx emissions % NOx–Mess downstream of the SCR catalytic converter
facQtyalt is a long-term adaptation factor during the fill level adaptations.

In said embodiment, the optimum additional dosing factor facDos can be determined with particularly high precision. If, during the individual fill level adaptations, the NOx emissions % NOx are kept at the model value, the calculated adaptation factor facQtyAdap will lie close to 1.0, such that the additional dosing factor need scarcely be corrected, or need not be corrected at all. If, for various reasons, for example owing to the operating point, a fill level adaptation cannot be carried out regularly, the measured NOx concentration % NOx–Mess can deteriorate in relation to the calculated NOx concentration % NOx–Mod. In this case, the additional dosing factor will be too small. Owing to the resulting reduced conversion in the SCR catalytic converter 12, the optimum adaptation factor facQtyAdap will then lie at a value of greater than 1.0, and the additional dosing factor facDos, which is calculated as being too small, will correspondingly be increased, such that optimum exhaust-gas after treatment is ensured.

The present long-term adaptation factor facQtyAdap may advantageously be overwritten or corrected by the additional dosing factor facDos calculated according to the invention. If appropriate, corresponding values may be temporarily stored in the control unit 17.

Figure 5:
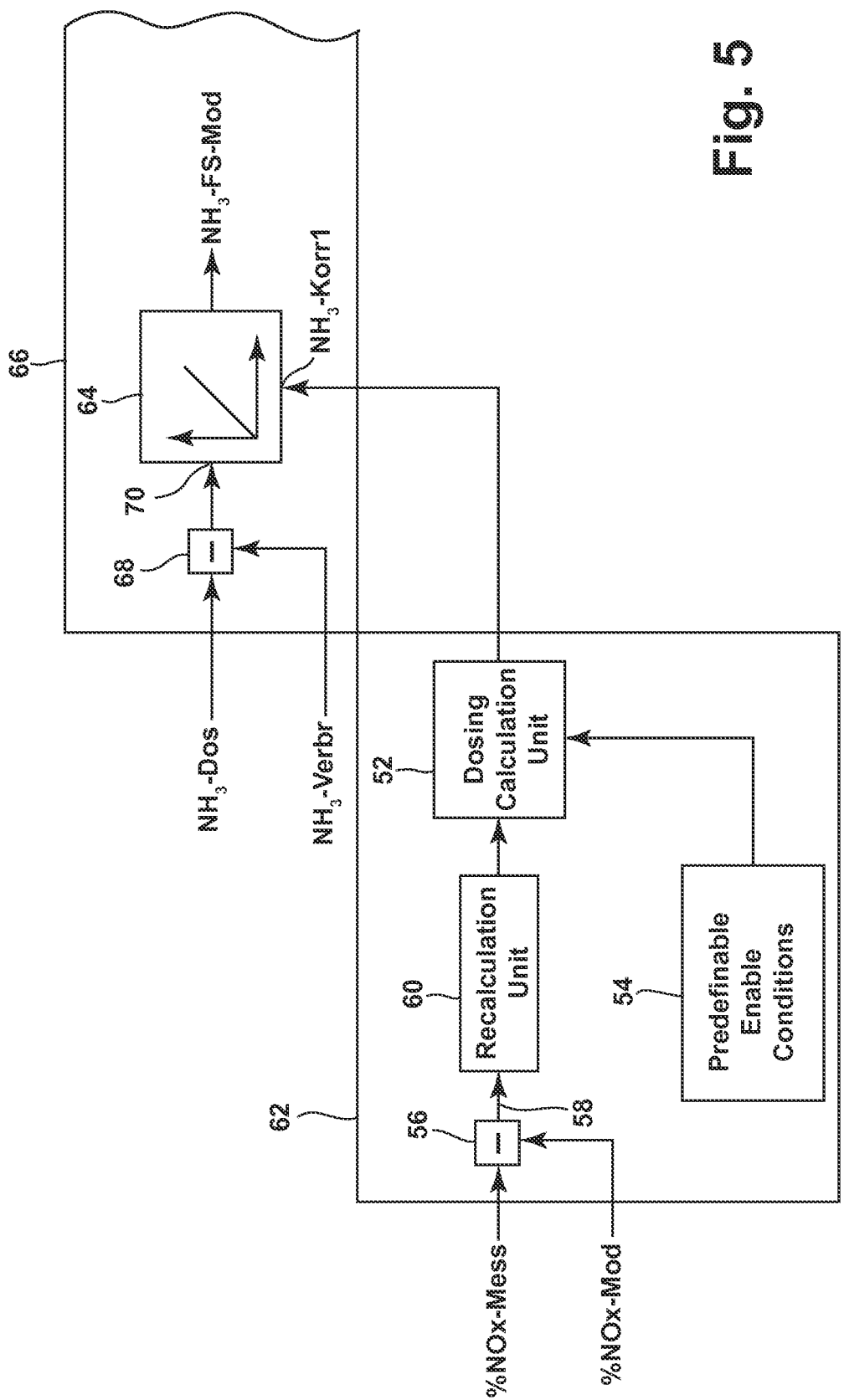
FIG. 5 is a first diagrammatic sketch showing the execution of the method according to the invention.

FIG. 5 shows a first possibility for the implementation of the principle of the approach according to the invention, in which the dosing of reagent takes place in the case of a conversion deficit being detectable, or in the case of a difference between the measured actual NOx concentration % NOx–Mess and the calculated NOx concentration % NOx–Mod, in each case downstream of the SCR catalytic converter 12, using a dosing calculation unit 52.

The calculations in the dosing calculation unit 52 may be made dependent on predefinable enable conditions 54.

A first comparator 56 determines a difference 58 between values which represent the actual NOx concentration % NOx–Mess and the calculated NOx concentration % NOx–

Mod, in each case downstream of the SCR catalytic converter 12. A possibly occurring difference 58 may be recalculated, in a recalculation unit 60, from ppm into mg/s, before the difference 58 (% NOx–Mess–% NOx–Mod) downstream of the SCR catalytic converter 12 is provided to the dosing calculation unit 52.

The dosing calculation unit 52, if appropriate the recalculation unit 60, if appropriate the first comparator 56 and if appropriate the predefinable enable conditions 54 may be realized in terms of programming technology within a Luenberger observer 62.

According to a first exemplary embodiment, the dosing calculation unit 52 determines a first fill level correction $NH_3$-Korr1, which corresponds to an offset for the calculated reagent fill level $NH_3$—FS-Mod. The first fill level correction $NH_3$-Korr1 is provided to an integrator 64, which may be incorporated in a fill level regulator 66. The difference 70, determined by a second comparator 68, between the consumed reagent amount $NH_3$-Verbr and the dosed reagent amount $NH_3$-Dos is provided to the integrator 64 of the fill level regulator 66. The catalytic converter balance is determined from the dosed reagent amount $NH_3$-Dos and the consumed reagent amount $NH_3$-Verbr. Therefore, if more is dosed than is consumed, the calculated reagent fill level $NH_3$—FS-Modulated or the actual reagent fill level $NH_3$—FS-Ist in the SCR catalytic converter 12 increases. If less is dosed than is consumed, the reagent fill level $NH_3$—FS in the SCR catalytic converter 12 correspondingly decreases.

The possibly required correction of the calculated reagent fill level $NH_3$—FS Mod is performed by the first fill level correction $NH_3$-Korr1, which immediately changes the offset and thus the calculated reagent fill level $NH_3$—FS-Modulated in the SCR catalytic converter 12, without a value initially having to be integrated. In the case of underdosing of the reagent being assumed, the present calculated reagent fill level $NH_3$—FS-Mod is immediately decreased, such that the further components (not shown) of the fill level regulator 66 increase the dosing of the reagent in order to restore the predefined setpoint reagent fill level $NH_3$—FS-Soll.

The increase of the dosing corresponds to the measure 33 in which, as per the lower part of FIG. 3, the present calculated reagent fill level $NH_3$—FS-Mod (i) is changed as quickly as possible, preferably in a step-like manner, to the subsequent calculated reagent fill level $NH_3$—FS-Mod (i+1).

In the case of an occurring difference 58, there is thus an immediate reaction, and the difference 58 that possibly exists is reduced to at least approximately zero as quickly as possible, whereby the SCR catalytic converter 12 has its maximum possible conversion rate, or its maximum possible efficiency eta, again owing to the corrected reagent fill level $NH_3$—FS.

Figure 6:
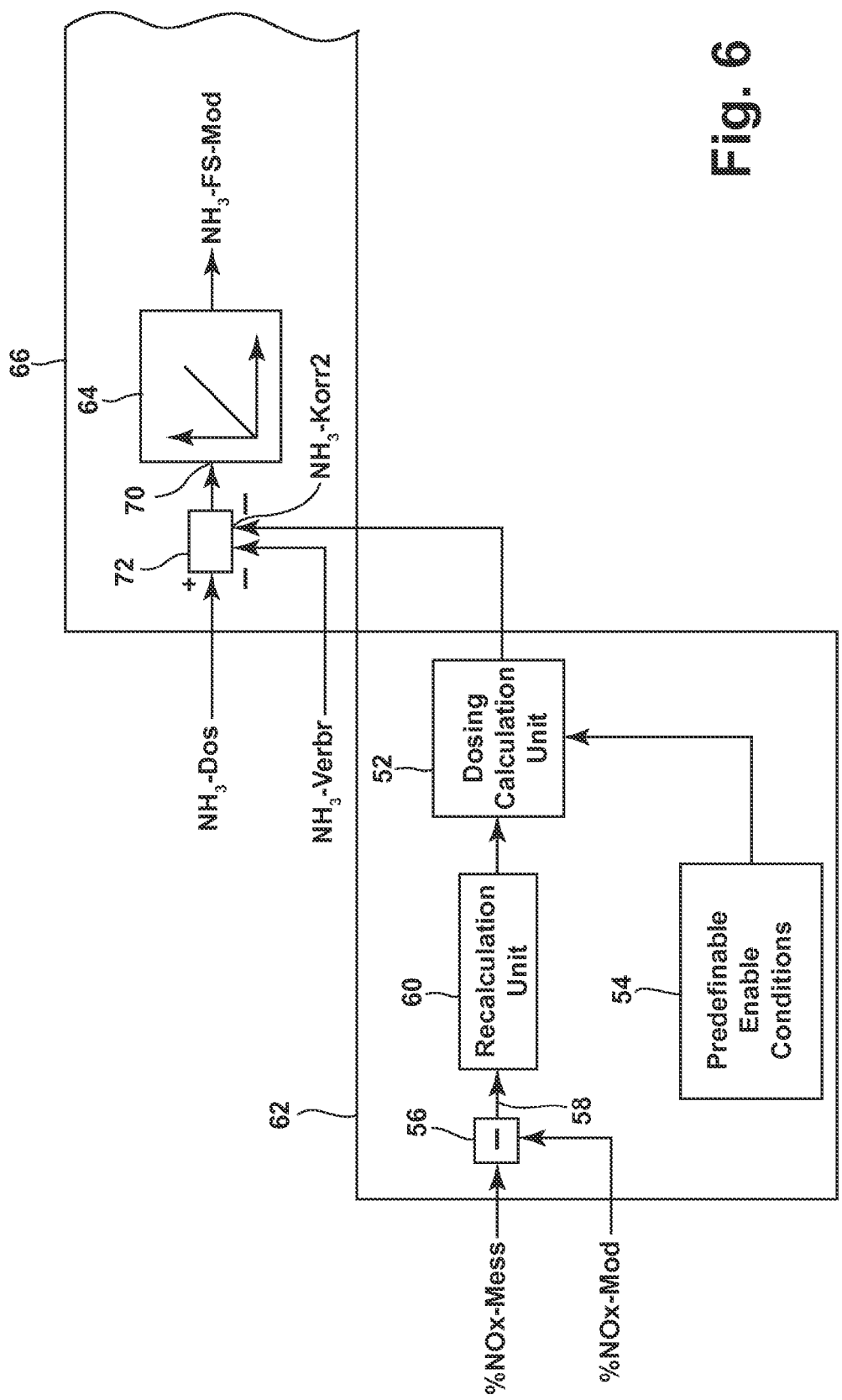
FIG. 6 is a further diagrammatic sketch showing the execution of the method according to invention.

FIG. 6 shows a further possibility for the implementation of the principle of the approach according to the invention, in which the dosing of reagent takes place in the case of a conversion deficit being detectable, or in the case of a difference between the measured actual NOx concentration % NOx–Mess and the calculated NOx concentration % NOx–Mod, in each case downstream of the SCR catalytic converter 12, using the dosing calculation unit 52.

Those parts which are shown in FIG. 6 and which correspond to the parts shown in FIG. 5 are provided in each case with the same reference signs. The possible implementation shown in FIG. 6 differs from the possible implementation shown in FIG. 5 in that, instead of a change of the offset of the integrator 64, the desired correction amount $NH_3$-Korr2 is output by the dosing calculation unit 52 as an input variable of the integrator 64. For this purpose, a third comparator 72 may be provided which has three inputs. Like the consumed reagent amount $NH_3$-Verbr, the desired or required correction amount $NH_3$-Dos is in this case incorporated negatively, such that if an insufficient efficiency eta of the SCR catalytic converter 12 is detected, the calculated reagent fill level $NH_3$—FS-Mod is decreased by the integrator 64.

In this exemplary embodiment, the measure 33 likewise corresponds to an increase of the dosing, in which, by contrast to the lower part of FIG. 3, the present calculated reagent fill level $NH_3$—FS-Mod (i) is duly still changed as quickly as possible, but continuously owing to the integration, to the subsequent calculated reagent fill level $NH_3$—FS-Mod (i+1).

As a result of the decrease, the further components (not shown) of the fill level regulator 66 will increase the reagent fill level $NH_3$—FS in the SCR catalytic converter 12 in order that the SCR catalytic converter 12 has the desired high efficiency eta again.

Since, in this implementation example, the integrator 64, owing to the integration process, leads to a time delay in the follow-up regulation of the reagent fill level $NH_3$—FS, the reagent fill level $NH_3$—FS can be corrected not immediately but in any case promptly in a very short time, because the integration time constant of the integrator 64, as already mentioned, lies in the range of seconds or a few minutes, and is thus considerably shorter than any adaptation measure.

Alternatively, the correction amount $NH_3$-Korr2 may, instead of being transmitted to the third comparator 72, be used for addition to a reagent pilot-control amount.

Figure 7:
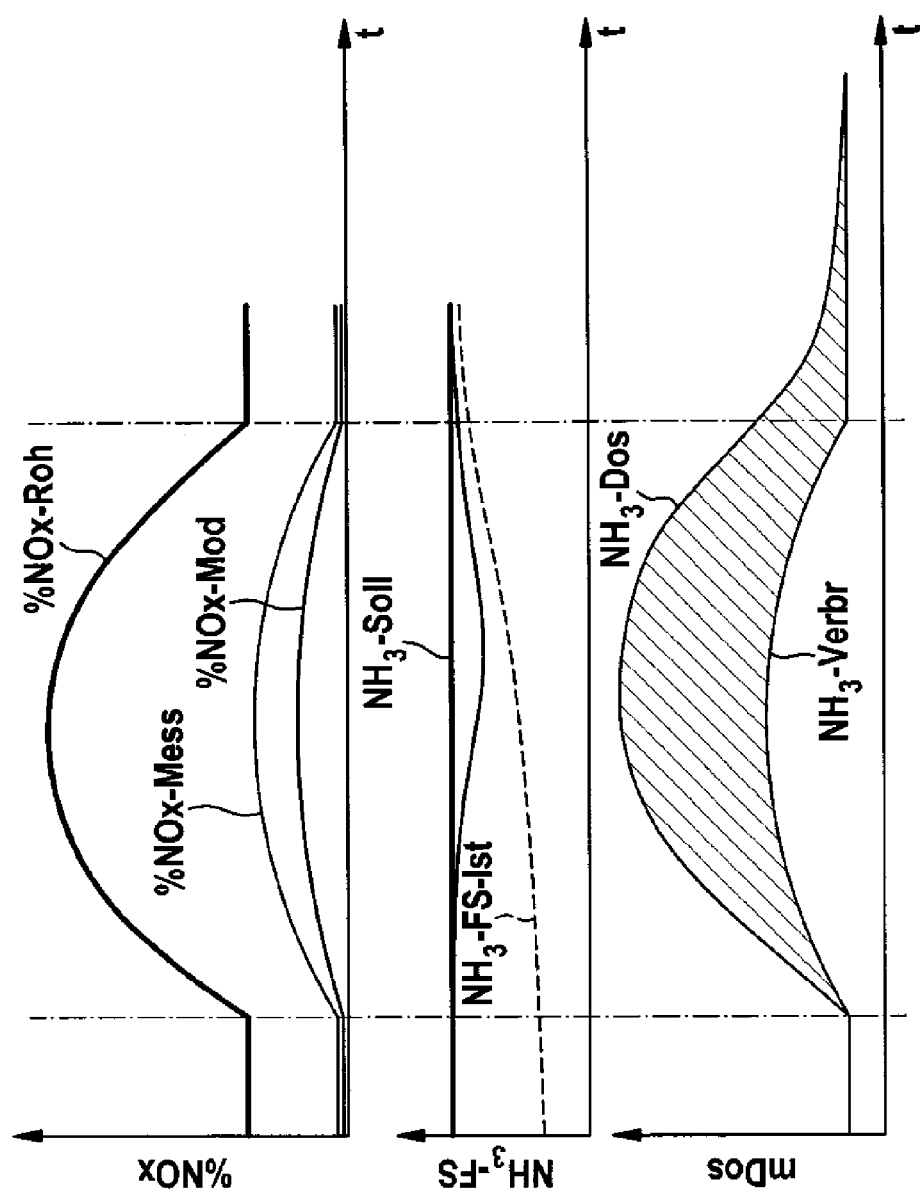
FIG. 7 is a schematic illustration of the profile with respect to time of the NOx concentration downstream of the SCR catalytic converter (upper part), of the reagent fill level (middle part) and of the dose amount (lower part) during the course of the long-term adaptation according to the invention, using fill level regulation for the dosings.

FIG. 7 shows the profile with respect to time of the measured NOx concentration % NOx–Mess downstream of the SCR catalytic converter 12 (top), of the reagent fill level $NH_3$—FS (middle) and of the dose amount mDos (bottom) during the execution of the method according to the invention using the described regulation. The vertical dash-dotted lines enclose the time range in which a difference 58 arises between the measured NOx concentration % NOx–Mess and the calculated NOx concentration % NOx–Mod downstream of the SCR catalytic converter 12. The uppermost curve profile shows the untreated NOx emissions % NOx–Roh of the internal combustion engine 11 that occur upstream of the SCR catalytic converter 12.

In the case of a difference 58 greater than zero, the Luenberger observer 62 determines a positive correction amount $NH_3$-Korr1, $NH_3$-Korr2, such that the integrator 64 detects a seemingly higher consumed reagent amount, whereby dosing is triggered. The desired correction amount $NH_3$-Korr1, $NH_3$-Korr2 thus passes into the system.

The lower part of the figure shows the overall dose amount demand $NH_3$-Dos which is made up of the pilot-control amount plus the fill level regulator amount and which can be corrected with an adaptation factor. It is possible in particular for the overall dose amount demand $NH_3$-Dos to be multiplied by an adaptation factor in order to adapt the dose amount demand $NH_3$-Dos to the dosing valve 13, such that comparability between the consumed reagent amount $NH_3$-Verbr and the overall dose amount demand $NH_3$-Dos is attained. The hatched area shows the additional dose amount. Said profile with respect to time during the execution of the method according to the invention shows the continuous adaptation of the reagent fill level $NH_3$—FS by additional dosings of reagent and thus an approximation of the actual reagent fill level $NH_3$—FS-Ist to the setpoint reagent fill level $NH_3$—FS-Soll during the course of the method according to the invention.

The fill level adaptations according to the invention are based on the assumption that a reduced NOx conversion of the SCR catalytic converter 12 is caused by NOx slippage or underdosing of the reagent. The sensor 18, which is sensitive at least with respect to NOx, downstream of the SCR catalytic converter 12 possibly cannot, owing to cross-sensitivity, distinguish NOx from reagent, for example $NH_3$, such that said cross-sensitivity of the sensor 18 yields a summed signal of NOx and $NH_3$. Therefore, if a breakthrough of $NH_3$ through the SCR catalytic converter 12 takes place, the signal of the sensor 18 increases, and the fill level adaptation according to the invention would also be performed in the case of said reagent slippage. If overdosing is already present and if the fill level adaptation according to the invention continues to be performed, the already excessively high reagent fill level $NH_3$—FS in the SCR catalytic converter 12 will be increased further. This results in further reagent slippage with further reduced NOx conversion in the SCR catalytic converter 12 and in further, greater fill level adaptations.

Since continuous reagent slippage in relatively large amounts should be prevented for environmental protection and consumption reasons, the described instability is utilized to be able to detect overdosing of reagent. The method is preferably adapted correspondingly if overdosing is detectable. Reagent slippage can be detected very simply, for example, if the measured NOx concentration % NOx–Mess downstream of the SCR catalytic converter 12 is greater than that upstream of the SCR catalytic converter 12, because said situation physically cannot be based on an escape of NOx from the catalytic converter 12. If said situation arises, this can, according to the invention, be detected very quickly in order to initiate corresponding measures. Reagent peaks of for example up to 150 ppm may duly arise up to the point of reagent slippage being detected. In relation to the driving cycle of a motor vehicle as a whole, and the rather rare occurrence of reagent slippage, this is however non-critical.

If reagent slippage is detected, in particular by the software in the control unit 17 of the internal combustion 11, the following measures are for example possible:

provisional shut-off of the fill level adaptation;

initialization of the calculated reagent fill level $NH_3$—FS-Mod in the SCR catalytic converter 12 with the maximum physical value taking into consideration the present SCR catalytic converter temperature. As a result, the dosing by the fill level regulator 66 will be stopped until the nominal reagent fill level $NH_3$—FS-Soll in the SCR catalytic converter 12 is attained;

reduction of the present long-term adaptation factor for example by means of a factor or offset or by means of a combination of both. In corresponding tests, the present long-term adaptation factor, which ultimately led to instability, was halved during continued operation, yielding very good results.

Other measures for the adaptation of the method according to the invention if overdosing is detectable are also possible. Different measures may be combined with one another. Subsequently to the adaptation of the method, in the case of a possibly occurring underdosing, the incorrect dosing can be corrected again by the fill level adaptation according to the invention.

The method according to the invention for operating an SCR catalytic converter 12 can be used for example in all vehicles having a conventional exhaust system which comprises an SCR catalytic converter 12. Here, typical arrangements in the exhaust-gas flow direction are for example oxidation catalytic converter, dosing unit for reagents which split to form reagent or split to form $NH_3$, and SCR catalytic converter 12, or in another embodiment, oxidation catalytic converter, particle filter, dosing unit for reagents which split to form reagent or split to form $NH_3$, and SCR catalytic converter 12, or similar arrangements.

The invention claimed is:

1. A method for operating an SCR catalytic converter provided for the reduction of NOx in exhaust gases of an internal combustion engine, which SCR catalytic converter is operated with a reagent which can be stored in the SCR catalytic converter such that there is a certain reagent fill level in the SCR catalytic converter, the method comprising:

monitoring an actual NOx concentration downstream of the SCR catalytic converter on the basis of a signal of a sensor, which is arranged downstream of the SCR catalytic converter and which is sensitive at least with respect to NOx, comparing the actual NOx concentration to a calculated NOx concentration downstream of the SCR catalytic converter, and correcting a previously calculated reagent fill level to a new calculated reagent fill level when comparison indicates a deficit between the measured actual NOx concentration and the calculated NOx concentration and immediately dosing reagent;

further comprising in dosings carried out during the course of the operation of the catalytic converter, a summed dose amount additional dosing ($mDOS_{add}$) is integrated to give the summed dose amount of regular dosings ($mDOS_{reg}$), and from an overall summed dose amount ($mDOS_{tot}$) in relation to an assumed summed dose amount without dosings having taken place, an additional dosing factor for the operation of the SCR catalytic converter is determined.

2. The method according to claim 1, wherein the result of the comparison is supplied to a dosing calculation unit which provides an output variable which effects the correction of the calculated reagent fill level.

3. The method according to claim 1, wherein the reagent fill level in the SCR catalytic converter is regulated to a setpoint value by a reagent fill level regulator.

4. The method according to claim 3, wherein correction of the calculated reagent fill level is effected, at least in part, by a change of an offset of an integrator incorporated in the reagent fill level regulator.

5. The method according to claim 3, wherein the correction of the calculated reagent fill level is effected, at least in part, by a change of an input variable of an integrator incorporated in the reagent fill level regulator.

6. The method according to claim 1, wherein the summed dose amount of the additional dosings ($mDos_{Add}$) is corrected with the additional dosing factor.

7. The method according to claim 1, wherein a long-term adaptation factor presently used for the operation of the SCR catalytic converter is replaced or corrected by the additional dosing factor.

8. The method according to claim 1, wherein, during the execution of the method, checking whether overdosing of reagent into the SCR catalytic converter occurs, and in that the execution of the method is adapted if overdosing is detectable.

9. The method according claim 8, including detecting a reagent slippage to determine overdosing.

10. A computer program which performs all of the steps of a method according to claim 1 when it is executed on a computer or a control unit.

11. A computer program product having program code, which is stored on a non-transitory machine-readable medium, for carrying out a method according to claim 1 when the program is executed on a computer or a control unit.

12. The method according to claim 1, including:
calculating a NOx concentration downstream of the SCR catalytic connector to obtain the calculated NOx concentration downstream of the SCR catalytic converter, and
calculating a reagent fill level to obtain the previously calculated reagent fill level.

13. A method for operating an SCR catalytic converter provided for the reduction of NOx in exhaust gases of an internal combustion engine, which SCR catalytic converter is operated with a reagent which can be stored in the SCR catalytic converter such that there is a certain reagent fill level in the SCR catalytic converter, the method comprising:
monitoring an actual NOx concentration downstream of the SCR catalytic converter on the basis of a signal of a sensor, which is arranged downstream of the SCR catalytic converter and which is sensitive at least with respect to NOx,
comparing the actual NOx concentration to a calculated NOx concentration downstream of the SCR catalytic converter, and
correcting a previously calculated reagent fill level to a new calculated reagent fill level when comparison indicates a deficit between the measured actual NOx concentration and the calculated NOx concentration and immediately dosing reagent;
wherein the dosing of reagent is adapted by an adaptation factor, wherein the adaptation factor is determined from the following formula:

facQty$A$dap=[($m$ % NOx–Roh–$m$ % NOx–Mod)/($m$ % NOx–Roh–$m$ % NOx–Mess)]*facQtyalt where:
$m$ % NOx–Roh is the integral of NOx untreated emissions % NOx–Roh;
$m$ % Nox–Mod is the integral of calculated NOx emissions % NOx–Mod downstream of the SCR catalytic converter;
$m$ % Nox–Mess is the integral of measured NOx emissions % NOx–Mess downstream of the SCR catalytic converter; and
facQtyalt is a long-term adaptation factor during the fill level adaptations.

14. A method for operating an SCR catalytic converter provided for the reduction of NOx in exhaust gases of an internal combustion engine, which SCR catalytic converter is operated with a reagent which can be stored in the SCR catalytic converter such that there is a certain reagent fill level in the SCR catalytic converter, the method comprising:
monitoring an actual NOx concentration downstream of the SCR catalytic converter on the basis of a signal of a sensor, which is arranged downstream of the SCR catalytic converter and which is sensitive at least with respect to NOx,
comparing the actual NOx concentration to a calculated NOx concentration downstream of the SCR catalytic converter, and
correcting a previously calculated reagent fill level to a new calculated reagent fill level when comparison indicates a deficit between the measured actual NOx concentration and the calculated NOx concentration and immediately dosing reagent;
further comprising during the execution of the method, checking whether overdosing of reagent into the SCR catalytic converter occurs, and in that the execution of the method is adapted if overdosing is detectable, wherein the execution of the method if overdosing is detectable includes at least one of provisional shut-off of the dosing, initialization of the calculated reagent fill level of reagent in the SCR catalytic converter by a maximum value and reduction of a long-term adaptation factor presently used for the operation of the SCR catalytic converter.

15. A method for operating an SCR catalytic converter provided for the reduction of NOx in exhaust gases of an internal combustion engine, the SCR catalytic converter being operated with a reagent stored in the SCR catalytic converter so that there is a certain reagent fill level in the SCR catalytic converter, comprising:
providing an initial predetermined NOx concentration and thereafter calculating a NOx concentration downstream of the SCR catalytic connector;
providing an initial assumed reagent fill level and thereafter calculating a reagent fill level;
monitoring an actual NOx concentration downstream of the SCR catalytic converter on the basis of a signal of a sensor, which is arranged downstream of the SCR catalytic converter and which is sensitive at least with respect to NOx;
comparing the actual NOx concentration initially to a predetermined NOx concentration and thereafter to a calculated NOx concentration downstream of the SCR catalytic converter;
correcting initially the assumed reagent fill level and thereafter a previously calculated reagent fill level to obtain a new calculated reagent fill level when comparison indicates a deficit between the measured actual NOx concentration and the calculated NOx concentration; and
immediately dosing the reagent when the comparison indicates a deficit;
further comprising in dosings carried out during the course of the operation of the catalytic converter, a summed dose amount additional dosing ($mDOS_{add}$) is integrated to give the summed dose amount of regular dosings ($mDOS_{reg}$), and from an overall summed dose amount ($mDOS_{tot}$) in relation to an assumed summed dose amount without dosings having taken place, an additional dosing factor for the operation of the SCR catalytic converter is determined.

16. The method of claim 15, including a computer program product having a program stored on a non-transitory machine-readable medium and implementing the steps of:
providing an initial predetermined NOx concentration and thereafter calculating a NOx concentration downstream of the SCR catalytic connector,
providing an initial assumed reagent fill level and thereafter calculating a reagent fill level,
monitoring an actual NOx concentration downstream of the SCR catalytic converter on the basis of a signal of a sensor, which is arranged downstream of the SCR catalytic converter and which is sensitive at least with respect to NOx,
comparing the actual NOx concentration initially to a predetermined NOx concentration and thereafter to a calculated NOx concentration downstream of the SCR catalytic converter,
correcting initially the assumed reagent fill level and thereafter a previously calculated reagent fill level, to obtain a new calculated reagent fill level when comparison indicates a deficit between the measured actual NOx concentration and the calculated NOx concentration, and immediately dosing the reagent when the comparison indicates a deficit.

* * * * *